June 2, 1942.  R. L. EWALD  2,284,647
FRUIT FEEDING APPARATUS
Filed May 10, 1938  6 Sheets-Sheet 1
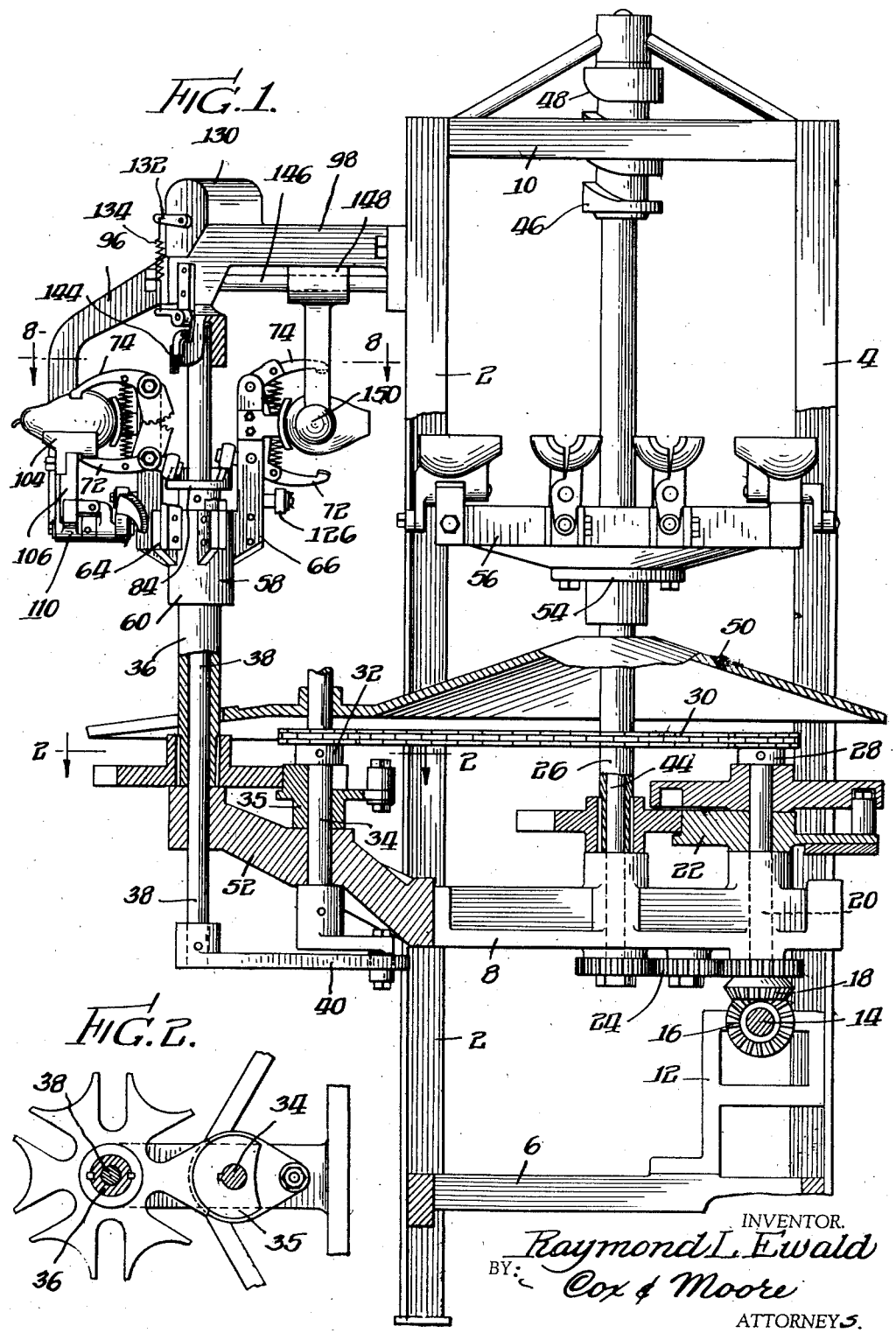
INVENTOR.
Raymond L. Ewald
BY: Cox & Moore
ATTORNEYS.

June 2, 1942.  R. L. EWALD  2,284,647
FRUIT FEEDING APPARATUS
Filed May 10, 1938  6 Sheets-Sheet 2
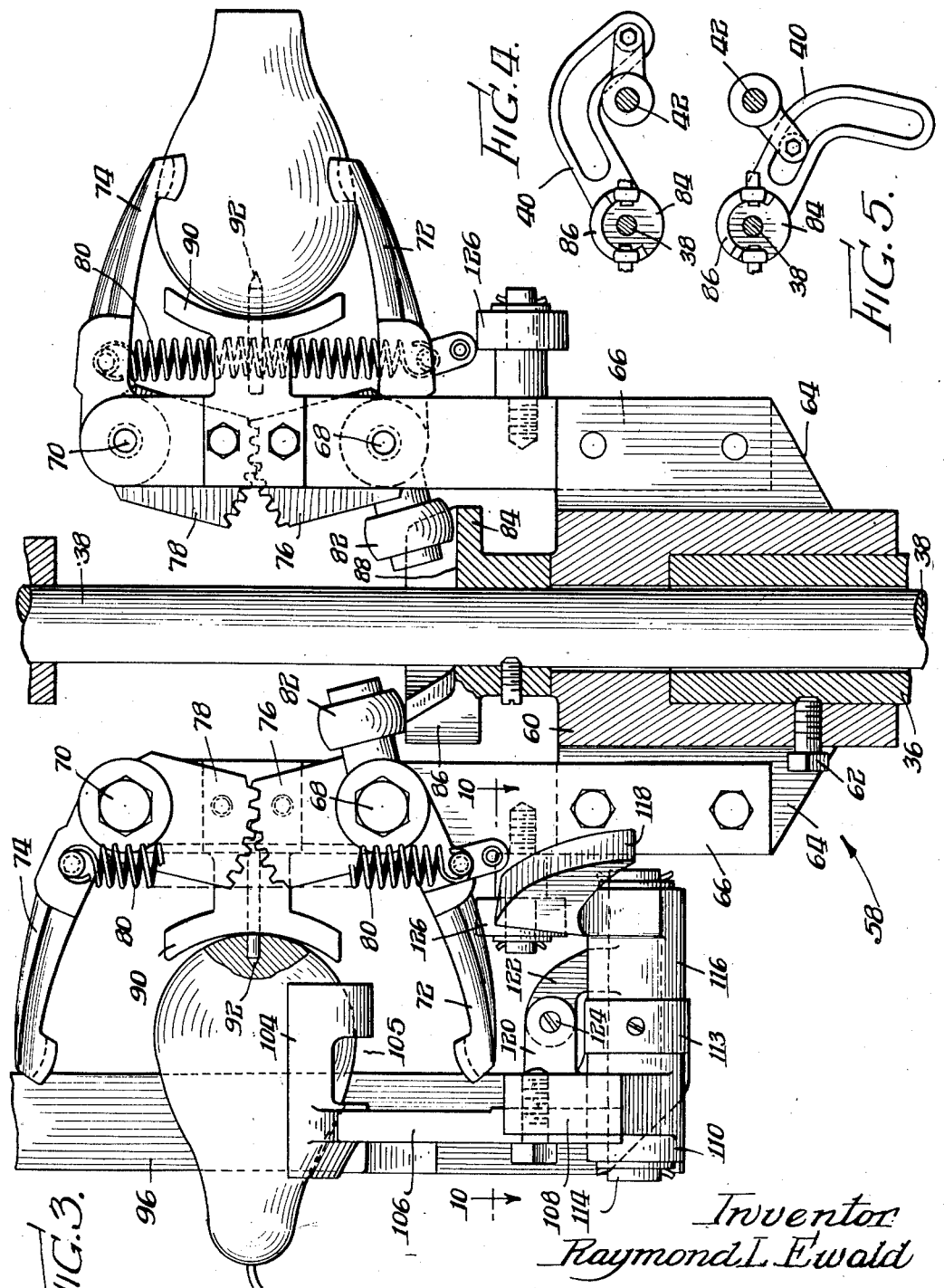

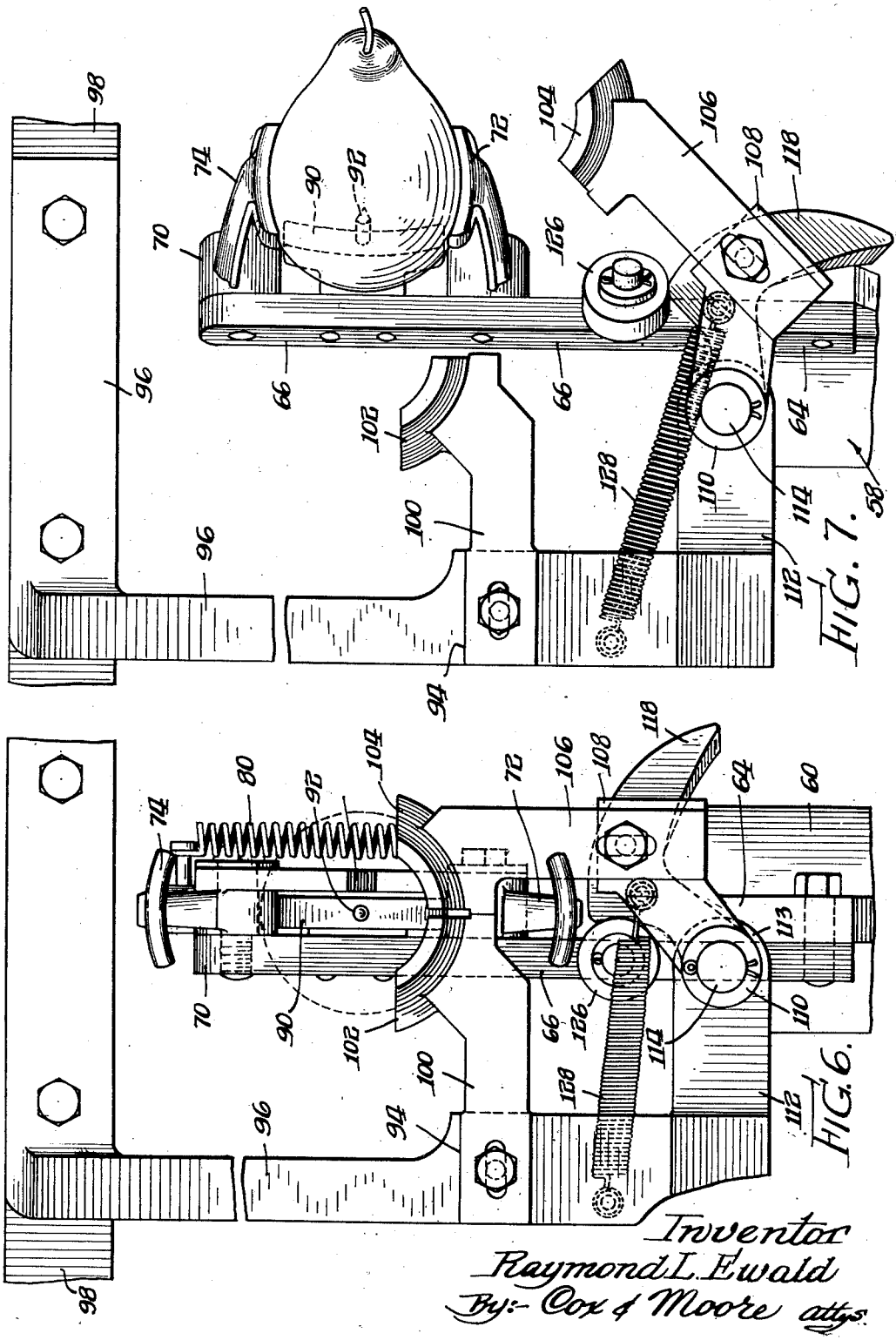

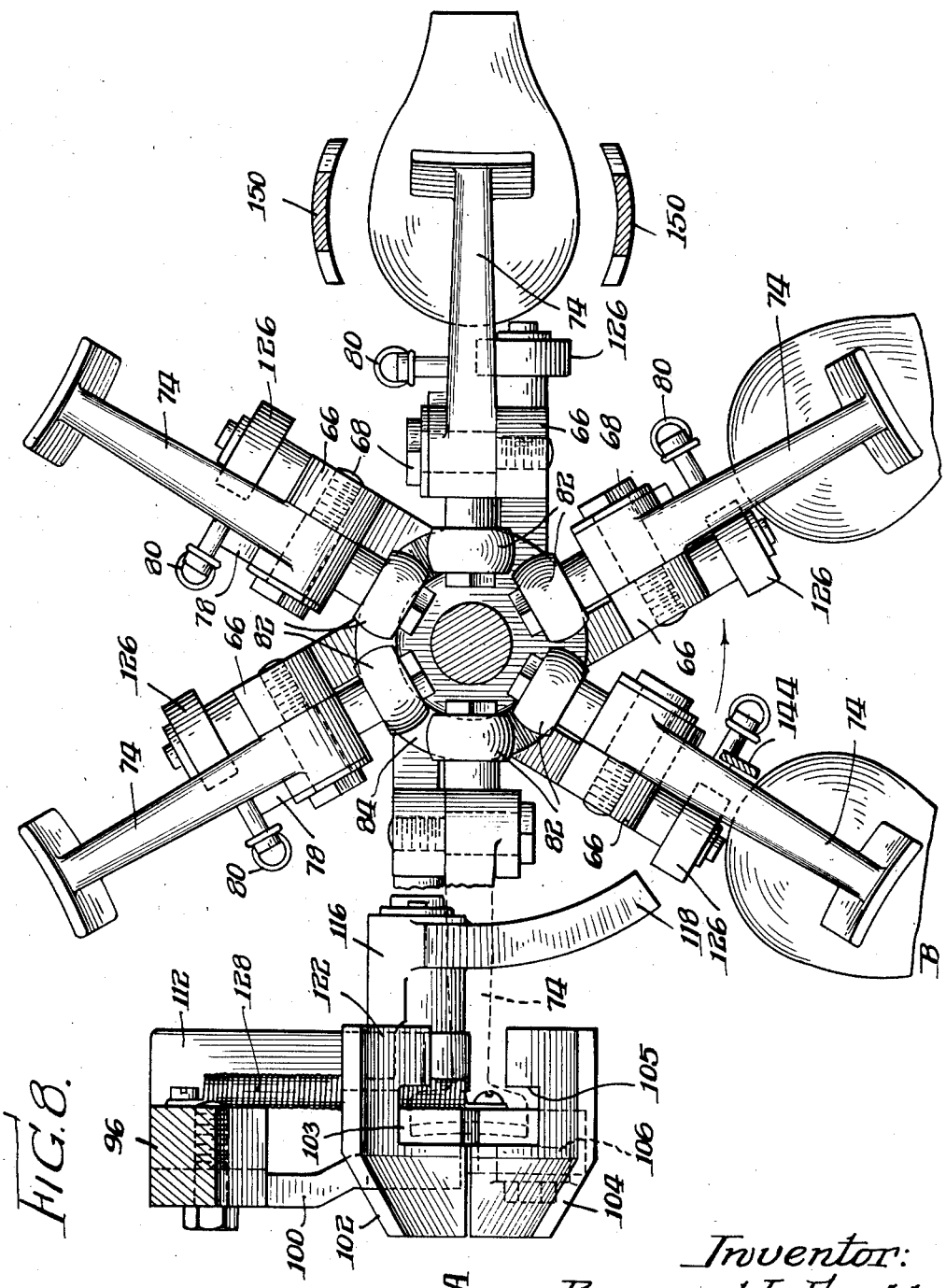

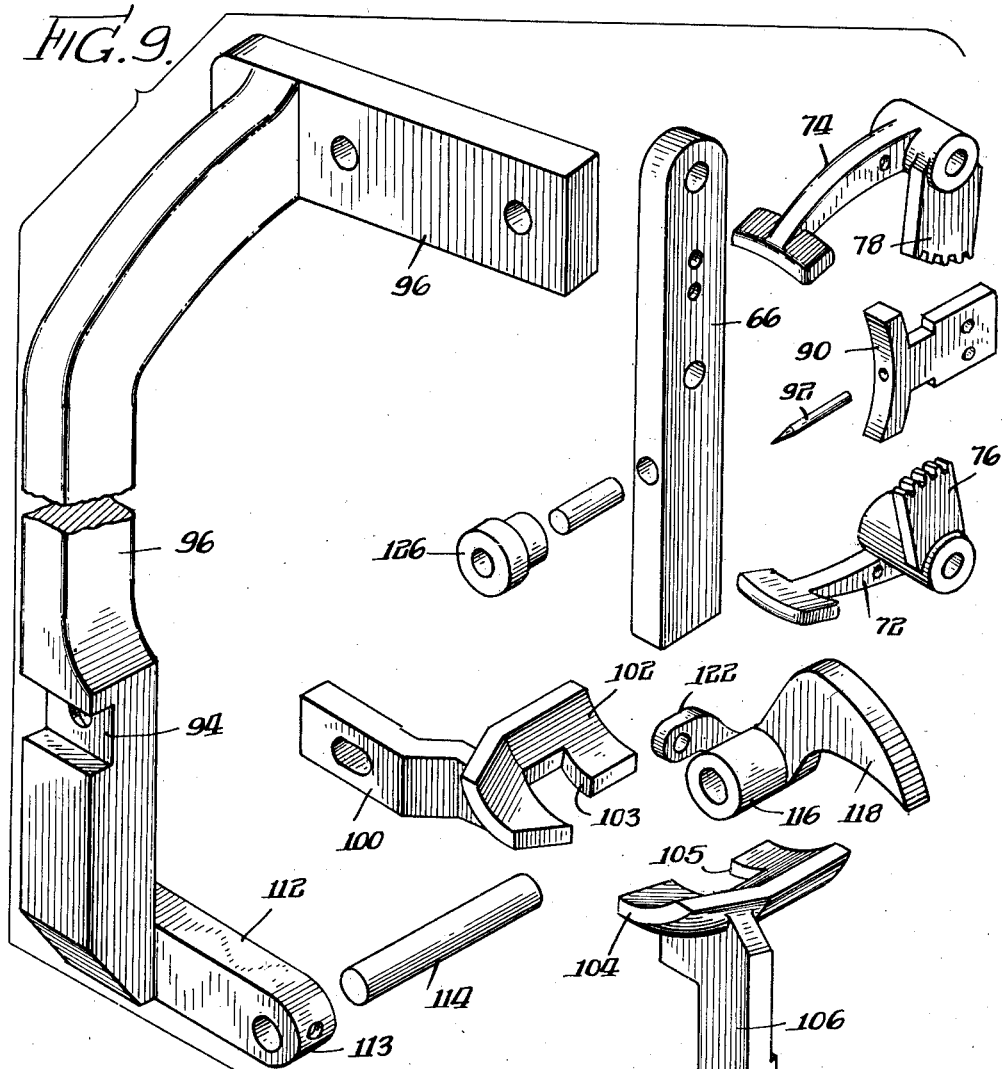
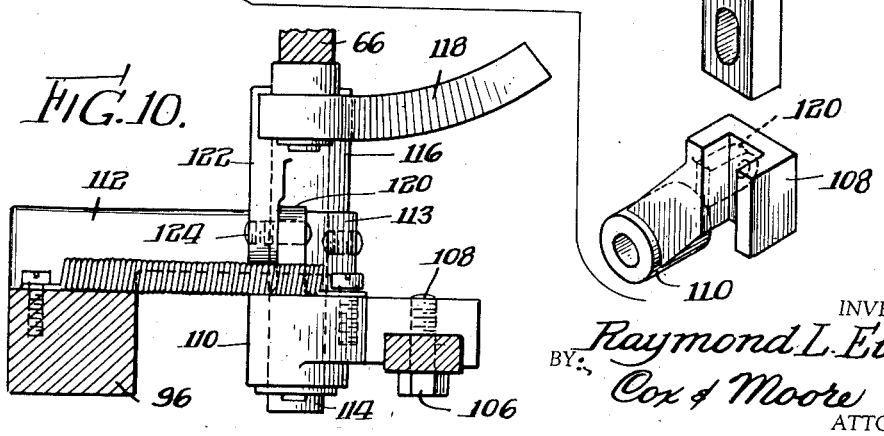

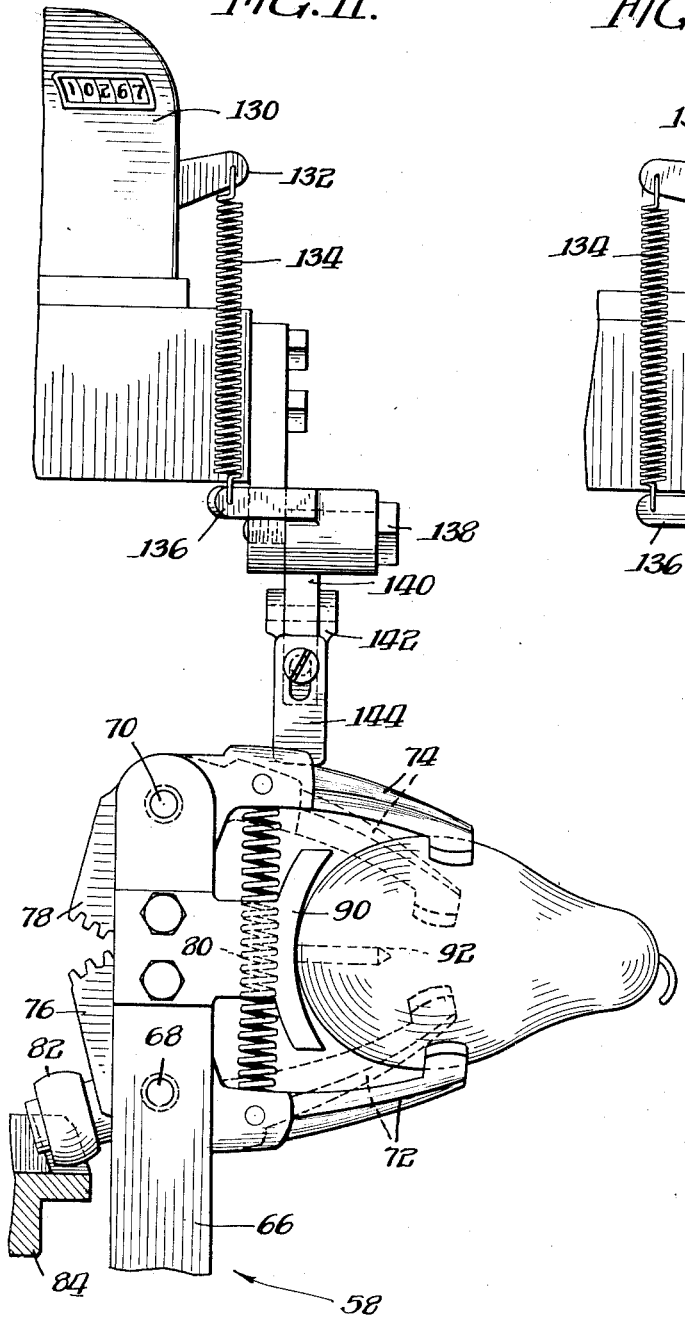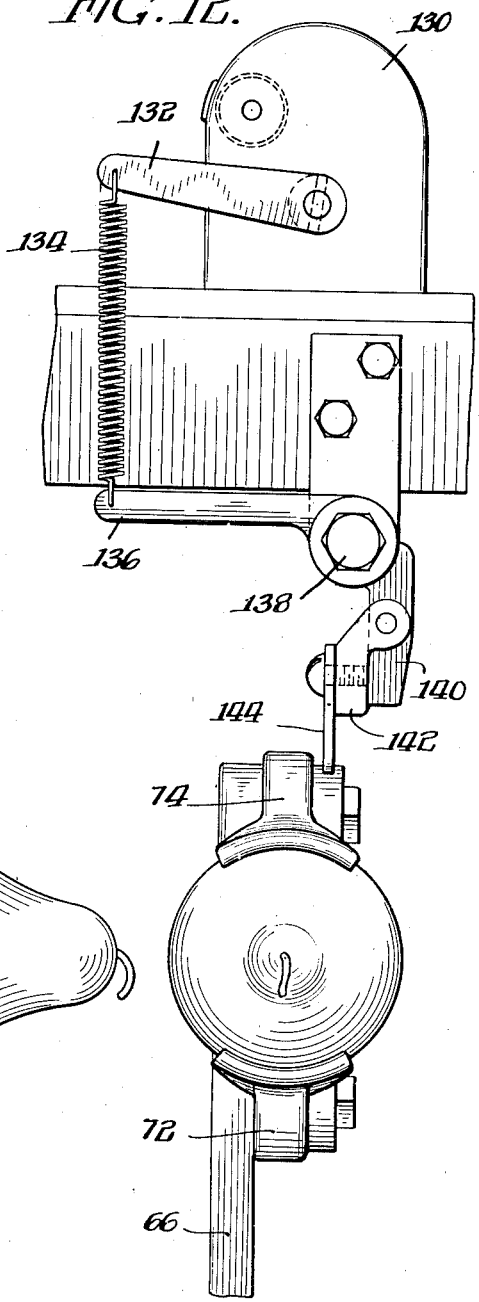

Patented June 2, 1942

2,284,647

UNITED STATES PATENT OFFICE 2,284,647

FRUIT FEEDING APPARATUS

Raymond L. Ewald, Olympia, Wash., assignor to Special Equipment Company, Portland, Oreg., a corporation of Oregon Application May 10, 1938, Serial No. 207,038

31 Claims. (Cl. 146—51)

This invention relates to fruit treating devices and more particularly to means for feeding a whole fruit to a continuously operating automatic machine for performing one or more operations upon the fruit.

Among the objects of the invention are to provid an improved feeding means for accurately and more speedily feeding whole fruit so that as they are fed into the machine and transferred to a second or third operating station they will be accurately positioned and maintained in such exact position; to provide an improved feeding means which permits an operator to position a whole fruit in an exact manner and let go of the fruit whereupon the machine will thereafter automatically grasps and firmly hold the fruit in the same position and carry it to subsequent stations or station; to provide means for serially counting the fruit fed by the machine and in such a manner that the counter is not actuated unless a fruit is in fact fed through the machine; to provide an improved feeding device wherein the fruit is exactly positioned and loosely held in such a manner as to permit the operator to release all hold of the fruit and thereafter the fruit will be automatically grasped and carried in the identical position and thus held for bobbing or other cutting operations; to provide these and other objects of invention as will be more evident from a perusal of the following specification when taken in connection with the accompanying drawings, wherein:

Fig. 1 is a side view of the device;

Fig. 2 is a section on line 2—2 of Fig. 1;

Fig. 3 is a vertical section of the feed turret;

Figs. 4 and 5 are detail plane sectional views of the mechanism for controlling the jaw operating cams;

Figs. 6 and 7 are views showing successive positions of the feed turret;

Fig. 8 is a plan sectional view taken on line 8—8 of Fig. 1;

Fig. 9 is a composite perspective view of parts for the feed turret;

Fig. 10 is a plan sectional view taken on line 10—10 of Fig. 3; and

Figs. 11 and 12 are views at right angles of the feed turret with the counter mechanism attached.

In general, the invention includes any desired type of frame, preferably four uprights, only the front ones 2 and 4 being shown, to form a substantially square support. At suitable elevations, a number of cross braces 6, 8 and 10 interconnect these four corner posts and provide supports or brackets. The cross bar 6 supports a bracket 12 in which is journalled the power driven shaft 14 carrying a gear 16 meshing with gear 18 on a vertical shaft 20 having its bearings in cross support 8. Through an appropriate Geneva drive 22, a turret sleeve 26 is given an intermittent rotation and in addition a sprocket 28 is given a continuous rotation for driving through the sprocket chain 30 another sprocket 32. This latter drives a shaft 34 and its Geneva mechanism 35 for intermittently turning a sleeve 36 surrounding shaft 38. This latter shaft is oscillated by a crank mechanism 40 from the shaft 34 continuously driven from sprocket 32. Hence, the main and auxiliary turret sleeves 26 and 36, respectively, are synchronously and intermittently driven. A main shaft 44 passes up through sleeve 26 for operating cams 46 and 48 which actuate the fruit spreader mechanism and transfer jaw mechanism hereinafter referred to. Shaft 44 is continuously driven by the gearing 24.

A suitable protective cover or shield 50 overlies the gearing and Geneva movements to protect them from the fruit juices and peelings.

Extending forwardly from two of the corner uprights is a laterally extending bracket 52 which supports and journals the two vertical shafts 38 and 34 and the Geneva mechanism 35.

Turret sleeve 26 has a collar 54 fastened to its upper end. A turret 56 is bolted to this collar. This turret carries a suitable number of spaced fruit holding means herein shown as fruit cups. In general, the fruit cups are arranged to receive and hold in each a half fruit with its cut face lying uppermost. In the present disclosure the cups are shaped to receive half pears. With suitable alterations, they may likewise hold half peaches or other fruits.

The main turret 56 is adapted to carry the fruit holders intermittently past a number of operating stations for effecting certain operations upon the fruit, such as peeling, coring, discharging the processed half fruit, and scavenging the peelings and seed section from the fruit holders, all in continuous cyclic manner as shown, for example, in Patent No. 2,210,909 issued to Mark Ewald on August 13, 1940.

The present invention is concerned particularly with an improved feeding device for supplying or feeding whole fruit, such as whole pears or whole peaches to the automatic machine so that the fruits will be accurately positioned in and relatively to the operating mechanism for performing one or more operations upon the fruit and will be accurately and firmly, yet resiliently, held during the time the fruit is going to be so operated upon. In addition, the feeding mechanism is constructed and arranged so that the operator may position a whole fruit into exact feeding position on the feed turret and may release her hold upon the fruit prior to the fruit being grasped by the automatic holding mechanism whereby the operator will have more time between the intermittent movements of the machine for effecting auxiliary feeding duties and whereby by the same token the speed of feeding and of the machine may be increased.

For carrying out the foregoing, the feed turret sleeve 36 rigidly carries at its upper end the turret 58 which, as shown in Fig. 3, includes a hub 60, pinned as at 62 to sleeve 36. Hub 60 carries a plurality of outstanding brackets 64 to which are attached vertically extending arms 66. Each arm 66 has pivoted thereto as at 68 and 70 a pair of fruit clamping jaws 72 and 74.

The jaws of each pair are provided with laterally extending toothed sectors 76 and 78 which mesh to assure simultaneous and equal movements of these jaws to open and closed position. Each pair of jaws is provided with a spring 80 which, having its opposite ends connected to the jaw members, normally tends to close said jaws upon the whole fruit and resiliently grasp the same.

Power operated means is utilized to shift the jaws 72 and 74 to open position and this jaw opening mechanism is synchronized to permit the spring means to close the jaws at desired times. To this end, one of each pair of these clamping jaws is provided with a laterally extending friction roller 82 for cooperation with an oscillating cam 84 surrounding and pinned to the oscillatable shaft 38. The upper face of this cam 84 is suitably constructed so that when a high part 86 is raising the roller 82 to open the jaws 72 and 74, as seen at the extreme left of Fig. 3, a low part 88, substantially diametrically opposite, permits the opposite pair of jaws to close under the action of spring 80. The oscillating movement of this cam 84 is timed to close the first clamping jaws 72 and 74 at the feed-in station just before the rotation of the feed turret begins and at the same time to open the jaws at each transfer station opposite.

In addition, each pair of clamping jaws carries means for indicating the correct position in which the whole fruit is to be placed between the jaws and also includes means for preferably piercing the whole fruit to retain the same in such exact position prior to being grasped by the spring operated jaws 72 and 74.

In the present instance, this is accomplished by providing a laterally extending seat 90 on the upright 66. Each seat is conformed to fit the blossom end of the whole fruit and at the center this seat 90 is provided with an outstanding spike or fruit piercing means 92. The fruit positioning member is made in different sizes to be interchangeable for variant sizes of fruit.

Operating in synchronism and in cooperation with the closing movements of the clamping fruit carrying and supporting jaws 72 and 74 of the feed-in turret is a mechanism for enabling the operator to position a whole fruit relatively to the open position of such clamping jaws 72 and 74 and in such a manner that when so positioned the operator may release hold of the fruit which will then be retained exactly as positioned, will be automatically grasped by the jaws 72 and 74 while still resting in the sections 102 and 104, and thereafter carried to a subsequent station for processing. When the jaws grasp the positioned fruit, the latter will be firmly but resiliently clamped and held in such exact position for such further operation.

To accomplish the foregoing, a cradle or auxiliary fruit holding means is provided. Mounted in a lateral slot 94 in a bracket 96 depending from an arm 98 extending forwardly from the main frame members 10 is an arm 100. This arm 100 carries a stationary section 102 of the feed cup having substantially horizontally disposed whole fruit supporting walls.

The half feed cup 102 has its low open side facing in the direction in which the clamping jaws move when intermittently rotated by the turret.

The right, or movable half 104 of the cup is mounted on an elongated stem 106 bolted within a U-shaped bearing block 108. The movable half 104 of the cup likewise comprises substantially horizontally disposed whole fruit supporting walls, these walls being arranged so that when the portions or sections 102 and 104 are juxtaposed they will form substantially continuously extending horizontally disposed fruit supporting walls upon which a whole fruit may be loosely placed and disposed with its longitudinal stem axis in predetermined position. This bearing block carried an integral laterally projecting hollow sleeve 110 forming a bearing. Both the stationary and shiftable cup sections 102 and 104 are provided with registering cut-outs 103 and 105 respectively, which permit the lower fruit clamping jaw 72 to pass thereinto and grip the fruit while still resting in the sections 102 and 104.

Extending laterally from the depending bracket 96 is a second support 112 carrying a bearing 113. Support 112 is located in a lower plane or below arm 109. This bearing 113 supports a shaft 114 which projects rearwardly and radially of the feed turret 60. This shaft 114 extends through bearing 113 into the hub 116 of a cam 118. A lug 120 projecting from hub or sleeve 110 is formed with an opening and is bolted to a lug 122 projecting forwardly from hub 116 of the cam 118 whereby movement is imparted from the cam 118 to the bearing block 108. Any desired means is provided such as screw 124 for adjusting this connection to adjust the position of the cup 104 relative to the stationary cup 102.

Cam 118 extends upwardly to contact a roller 126 fastened to the upright 66 carried by the feed turret. When the feed turret advances, this roller 126 rolls along the top of the cam 118 whereby the movable feed cup will be rotated about the shaft 114. In such position (see Fig. 7), the extended arm on the cam serves to open the cup if and when the machine is oppositely rotated or backed up, thus permitting the feed jaws 72 and 74 to pass over the cup unhindered. A spring 128 is fastened at one end to the block 108 and at the other end to support 96 for normally returning cam 118 to relatively upright position.

Means is provided for counting each fruit as it goes through the machine. Any type of counting mechanism 130 having an actuator 132 is connected by spring means 134 to a lever 136 pivoted at 138 to the frame. A second lever arm 140 of lever 136 depends toward the path of movement of the turret clamping jaws 72 and 74. Lever arm 140 carries another pivoted lever 142 which in turn carries the trigger 144. A fruit in the jaws 72 and 74 holds the upper jaw 74 up in a path where the trigger 144 will be contacted as the turret moves, thus causing the trigger to swing through an arc and actuating the levers to operate the counting mechanism. If no whole fruit is positioned between the jaws 72 and 74, the counting mechanism is not operated, as shown by dotted lines in Fig. 11.

By reference to Figs. 1 and 8, the adaptation of the present invention to one type of organized machine is disclosed for automatically feeding whole fruit, in the present instance illustrated as whole pears.

The whole fruit is fed in at station A. The turret then moves intermittently to carry the fruit to station B where the counting mechanism is actuated. Upon the next shift, the whole fruit, if it be a pear, is carried on the bobbing station, where the stem end is removed. The details of construction of the bobbing mechanism are not claimed herein, being claimed in Patent 2,161,806 issued to Mark Ewald on June 13, 1939, upon an application filed July 11, 1932, Serial No. 621,857, and also in my application Serial No. 207,039, filed May 10, 1938, entitled Fruit bobbing apparatus. The present fruit holding mechanism holds the fruit firmly and with the stem axis, in the case of a pear, and the longitudinal axis of the pit, in the case of a peach, in predetermined exact position with the stem axis located in a fixed horizontal plane and extending radially of the turret. This insures a clean, accurate bob of the stem and exactly at right angles to the stem axis.

At station marked A in Fig. 8, the spring 128 holds the movable cup section 104 in closed position and likewise holds the cam 118 in the position shown in Fig. 6. At this time, a whole fruit, such as a pear, is placed by the operator into position in the cup formed by the now adjacently positioned stationary cup sections 102 and 104, respectively, with the butt end of the pear resting against the curved fruit stop 90 and with the pin 92 piercing the calyx of the pear. Thus, the pear will be positioned accurately with its longitudinal axis disposed radially of the feed turret and with this longitudinal axis in a predetermined common, horizontal plane with the horizontal centers of the jaws of a transfer jaw mechanism hereinafter described. In this position, the clamping jaws 72 and 74 of the feed-in turet are positioned directly below and above the sectional cup members 102 and 104, a plane passing through the central portions of these jaws 72 and 74 likewise passing through the central portion of the piercing pin 92. In this position, the jaws are open as illustrated in Fig. 6.

Just before the feed-in turret 58 starts to move, the oscillating cam 84 will turn to permit the roller 82 to move down into the low part of the cam thereby permitting the coil spring 80, through the intermeshing gearing of the sectors 76 and 78, to move the jaws 72 and 74 equal distances, resiliently to close them upon the upper and lower surfaces of the pear. It will be noted that the lower jaw 72 will be moved through the registering slots 103 and 105 of the fixed and movable feed cups 102 and 104, so that the clamping jaws 72 and 74 will firmly and resiliently grasp the pear or other fruit, even though the fruit is still lying in the cup sections in accurately placed position.

By this time, the operator has let go of the pear so that she can attend to other operations. Thereafter, the turret 58 shifts in counter-clockwise direction, thereby causing the roller 126 on the turret to depress the cam 118, whereby to shift the movable cup section 104 to a downward, out-of-the-way position, as illustrated in Fig. 7, so that the clamping jaws 72 and 74 carried by the turret can then move the pear or fruit in a horizontal plane in a counter-clockwise direction. It will be noted that since the slot 103 of the fixed cup 102 is open and since the right movable feed cup has been shifted downwardly to an out-of-the-way position, the lower jaw 72 is free to move in this counter-clockwise direction. The clamping jaws, moving in this direction with the turret, firmly hold the fruit against the pear stop with the pin 92 piercing the calyx and with the clamping jaws 72 and 74 resiliently and firmly grasping the whole fruit centrally of a plane passing vertically through the center of the seed containing section of the half fruit. In the case of a peach, it will be held in a vertical plane extending parallel to the maximum diameter of the pit of the peach. Thus, the whole fruit will be caried in a counter-clockwise direction and held firmly yet resiliently in an exact position in which it was originally positioned by the operator and will be carried to the next succeeding station. In some instances this next succeeding station may be a bobbing station, or it may be a stem cavity trimming station, or it may be a transfer feed station. If the station be a bobbing or stem cavity slitting station, the fruit will be firmly held during these cutting operations. If the station be a transfer feed station, such as illustrated to the right of the feed-in turret in Fig. 1, the clamping jaws will be brought to this station for a very short interval. As the fruit carried by the jaws is brought to this station, the stem axis of the pear or the longitudinal pit axis of the peach will be disposed in an exact horizontal plane and radially of the turret 58. The exact horizontal plane is determined by the location of the fruit transfer means which is adapted to abduct or transfer the whole fruit to subsequent fruit treating means.

In the present disclosure, this fruit transfer means comprises a track or guide mechanism 146 supported at one end by the support 98 and at the other by suitable supports carried by the frame of the main turret. Inasmuch as the details of construction of this transfer mechanism are disclosed in Patent 2,261,150 issued November 4, 1941, upon an application Serial No. 9,573, filed March 6, 1935, by Mark Ewald, and is also disclosed and claimed in Ewald Patent No. 1,989,990, issued January 29, 1935, no further disclosure thereof is necessary here. For the purpose of cooperation with the feed turret and the operation of the clamping jaws and whole fruit feeding means 72 and 74, the feed turret 64 is brought to rest in alignment with the tracks 146. The jaws 72 and 74 are still in closed position on bottom and top of the fruit. Just at the time that the carriage 148 has been reciprocated to this point, by means not shown, the transfer jaws 150 being opened, will then be shifted toward each other from opposite sides of the fruit to grasp the sides of the fruit. Concurrently or slightly thereafter, the jaws 72 and 74 are then shifted by the cam 84 to open position, as illustrated in Fig. 1.

The transfer jaws 150 are spaced sufficiently apart above the whole fruit to permit movement in a vertical plane of the upper jaw 74 while at the same time permitting the transfer jaws 150 firmly to hold the whole fruit in exactly the same position in which it was carried by the turret feed mechanism. The feed jaws 150 will be pivotally swung in a direction at right angles to the line of movement of the carriage 148. Immediately the carriage 148 starts to the right, it pulls the whole fruit from the spike 92 and carries the whole fruit to the right to a subsequent processing station. Upon movement of the fruit by the transfer jaws, the feed-in turret again intermittently shifts in a counter-clockwise rotation to bring another whole fruit to the transfer station and sequentially to bring a pair of open jaws 72 and 74 to the feed-in station, all in continuous intermittent manner.

It will be evident from the foregoing that by my improved feeding means, an operator is enabled more accurately and speedily to feed whole fruit in practically continuous manner to the automatic machine which is operated intermittently at substantially high speed.

Having thus described my invention, what I claim as new and desire to secure by Letters Patent is:

1. In combination, fruit holding means comprising cooperative cup sections relatively movable and adapted to receive and position thereon a whole fruit, at least one of said cup sections having an opening in its base, additional fruit holding means comprising fruit gripping members adapted to be positioned directly over and under the fruit while resting in the cup, means for closing the gripping members into contact with the fruit, one of said members passing through the opening in the base of said cup section, and means for shifting said gripping members away from said cup sections and for relatively shifting said cup sections to permit movement of the fruit by said gripping members.

2. In combination, a stationary cup section having a basal open ended slot, a movable cup section having a registering open ended slot, means for shifting said cup sections to form a closed half cup and for shifting said movable cup section away from said stationary cup section, additional fruit gripping members and means for positioning said members, one directly over and the other directly under said half cup, for shifting said members to fruit gripping position, the lower member gripping said fruit through said basal slot, and means for thereafter shifting said gripping members laterally away from said stationary cup section, said lower gripping member moving laterally through said basal slot of the stantionary cup section.

3. In combination, a shiftable support carrying a fruit stop having a concaved surface conforming substantially to the calyx end contour of a whole fruit and having means adapted to impale the calyx end of said fruit, a stationary fruit holder and a movable fruit holder, said last mentioned holders having complementally concaved inner walls adapted to freely receive and support a whole fruit with the calyx end abutting the fruit stop and impaled on said impaling means, mechanism synchronously moving said shiftable support away from said stationary fruit holder and to shift said movable fruit holder and means movable with said shiftable support and stop and impaling means for automatically grasping and retaining the fruit in its impaled position as said shiftable support moves.

4. In combination, an intermittently rotatable turret, a plurality of radially spaced fruit grasping means thereon each comprising relatively shiftable members adapted on movement resiliently to grasp a whole fruit, a supporting frame stationary with respect to said turret, a fruit holder on said frame adjacent the path of movement of each fruit grasping means, a stationary fruit holder on said frame, a complemental fruit holder shiftably mounted on said frame and means for moving it adjacent said stationary holder and remote from said stationary holder, a concaved stop on said turret, a calyx piercing means associated with said stop, and means for synchronously actuating said turret to position one of said fruit grasping means, said stop and calyx piercing means opposite the central axis of said stationary and movable fruit holders when in adjacent position whereby to permit the exact positioning of a whole fruit with respect thereto and thence to shift said turret away from said stationary and movable holders and means for automatically actuating the relatively shiftable members of the cruit grasping means to grasp the fruit so positioned and prior to the movement of the turret.

5. In combination, on intermittently actuating turret, a pair of fruit grasping members thereon adapted to engage substantially opposed peripheral portions of the whole fruit, means for actuating said turret and for relatively shifting said grasping members, auxiliary fruit holding means disposed adjacent the path of movement of the turret and adapted to receive substantially opposed peripheral portions of a whole fruit when said turret stops with a pair of grasping members opposite thereto, additional means on said turret adapted to contact the periphery of the whole fruit and position the fruit when engaged by said fruit grasping members, and mechanism for relatively shifting said turret and said auxiliary holding means away from each other and for actuating said fruit grasping members to grasp and hold the fruit with the aid of said positioning means.

6. In combination, a frame, a vertical shaft thereon, a cam on said shaft, a sleeve around said shaft, a turret on said sleeve, means for intermittently rotating said turret and for actuating said cam shaft, a plurality of groups of relatively shiftable fruit positioning and holding members in spaced relation on said turret, at least one member of each group having an actuator disposed to be operated by said cam, a support for said frame, complemental fruit holders mounted thereon adjacent the path of movement of said turret, one of said latter holders being stationary and the other being movable, a second cam connected to said movable holder, and means on said turret for actuating said latter cam to shift the movable holder away from said stationary holder upon movement of said turret.

7. In combination, a shiftable support, a plurality of spaced fruit holders thereon, each including relatively shiftable members adapted to be shifted to wide apart position to hold a fruit therebetween, fruit counting means disposed in the path of movement of said support and disposed so that when said relatively shiftable members are positioned with a fruit therebetween, one of said members will actuate said counting means but not otherwise.

8. A feeding device for whole fruit comprising members relatively shiftable to and from each other and shaped so that when in relative adjacent position they are substantially cradle shaped and adapted loosely to hold a whole fruit with the longitudinal seed-containing axis of the fruit extending in a predetermined direction and in a predetermined plane, means relatively shiftable with respect to said cradle shaped means and adapted to be moved firmly and adjustably to grasp and hold said fruit in the position in which said fruit is resting in said cradle shaped members, said cradle shaped members being constructed and arranged to permit the grasping of the whole fruit by said second named holding means in such a manner as to prevent movement of the second named means in a predetermined direction while said cradle shaped members are in adjacent position, means for relatively shifting said cradle shaped members away from each other to permit movement of said second named means in said direction, and means for shifting said second named means to transfer the whole fruit from said cradle shaped means by means of said second named means to a point remote from said cradle shaped members, said second named means holding said fruit in such exact predetermined position.

9. In a device for holding and transporting whole fruit, the combination of stationary, whole fruit, substantially cradle-shaped supporting means adapted loosely to receive and support a whole fruit with the longitudinal axis of its seed section extending in a general predetermined direction, additional fruit holding means shiftable relatively to said cradle shaped supporting means and comprising relatively shiftable members and a centering means adapted to engage the fruit when positioned on said cradle-shaped supporting means, means for shifting said second mentioned holding means into registration with said cradle shaped supporting means whereby a whole fruit may be placed in said cradle shaped supporting means and may be engaged by the centering means of said second mentioned holding means whereby to center the whole fruit while otherwise loosely supported on said cradle shaped holding means, means for automatically actuating the relatively shiftable members of said second mentioned holding means firmly to grasp and hold the whole fruit while so centered in said cradle shaped supporting means, and means for removing the whole fruit by means of said second mentioned holding means from said cradle shaped supporting means and for transporting it to a zone remote from said cradle shaped supporting means.

10. In a device of the class described, the combination of whole fruit loading means including a stationary fruit supporting portion and a complemental relatively shiftable fruit supporting portion, said portions being adapted to be shifted relatively whereby said portions are positioned relatively adjacent each other and are thereafter positioned relatively remote from each other whereby when adjacently disposed a whole fruit may rest freely and loosely on said supporting portions with the longitudinal seed-containing axis of the whole fruit extending in a predetermined direction and with at least one end of the fruit at the seed axis exposed, transferring jaws shiftable relatively to said loading means, means for actuating said relatively shiftable jaws for firmly grasping the whole fruit while held on said loading means, means for producing a relatively shifting movement between said portions of the loading means to relatively position them remotely from each other, and means for thereafter shifting said transferring jaws to transport the whole fruit to a remote station.

11. In a device of the class described, the combination of cup shaped holding means into which a whole fruit is adapted to be loosely placed, the holding means contactingly supporting a substantial arcuate portion of the lower circumference of the whole fruit, said cup shaped holding means having an opening therein, additional holding means comprising relatively shiftable members adapted to grasp substantially opposed peripheral portions of the whole fruit, one of which shiftable members being adapted to enter said opening to engage a portion of the periphery of the whole fruit, said cup shaped holding means including portions relatively shiftable to remove a portion of said cup shaped holding means to permit movement of that portion of the second mentioned holding means entering the aperture of the cup shaped holding means, means to operate said second mentioned holding means firmly to grasp the whole fruit therebetween while loosely held in said cup shaped holding means, and means for shifting said second mentioned holding means to transfer the whole fruit to a point remote from said cup shaped holding means.

12. In a device of the class described, the combination of a plurality of complementally shaped holding means comprising relatively shiftable members, said members being so shaped that when in relatively closed position they are adapted to form a substantially cradle shaped support upon which a whole fruit with its seed-containing axis in predetermined direction may be manually laid and upon which the fruit is then loosely supported, said complemental holding members having portions formed with a space therebetween, additional holding members adapted to grasp and firmly hold the whole fruit in said holding means, said second mentioned holding means including a member adapted to be shiftably actuated to enter the space between said portions of said complemental holding means, and means for relatively separating said complemental holding members to a point to permit movement of said second mentioned holding means away from said complemental holding means to a point remote from said complemental holding means, said second mentioned holding means retaining the whole fruit therein in the predetermined position in which it was first placed in said complemental holding means.

13. In a device of the class described, the combination of concaved, relatively separable holding means adapted to receive and embrace a substantial arc of the lower peripheral portion of a whole fruit only intermediate the stem axis ends thereof with the longitudinal seed-containing axis of the fruit extending in predetermined direction and with one of said ends exposed, said concaved holding means having wall portions with a space therebetween, additional holding means comprising upper and lower jaws, the lower jaw being adapted to enter the space between the wall portions of said concaved holding means to contact the substantially lowermost arcuate portion of said whole fruit while held in said concaved holding means, the upper jaw contacting substantially the uppermost arcuate portion of said whole fruit while held in said holding means, means for actuating said jaws firmly to grasp the fruit while in said holding means, means for relatively separating said holding means, and means for shifting said upper and lower jaws thereafter to a zone remote from said holding means, said jaw members holding the whole fruit in said predetermined position.

14. In a device of the class described, the combination of concaved, relatively separable holding means each shaped so that when juxtaposed they form a cradle-shaped trough open at its top and having substantially continuously extending horizontal supporting walls adapted loosely to receive and embrace a substantial arc of the underneath portion of a whole fruit thus supported and with the longitudinal seed-containing axis of the fruit extending in predetermined direction and with one of the stem axis ends of the fruit exposed, said concaved holding means having wall portions with a space therebetween, additional holding means comprising upper and lower jaws, the lower jaw being adapted to enter between the spaced wall portions of said concaved holding means to contact the substantially lowermost arcuate portion of said whole fruit while held in said concaved holding means, the upper jaw contacting substantially the uppermost arcuate portion of said whole fruit while held in said holding means, means for actuating said jaws firmly to grasp the fruit while in said holding means, means for relatively separating said holding means, means for shifting said upper and lower jaws thereafter to a zone remote from said holding means, said jaw members holding the whole fruit in said predetermined position, additional transfer jaws comprising spaced apart members adapted to grasp substantially opposed portions of the whole fruit while held by said upper and lower holding jaws, said transfer jaws grasping the circumference of the whole fruit substantially midway of those portions of the whole fruit which are grasped by said upper and lower jaws, means for opening and closing said upper and lower jaws, and means for opening said second mentioned jaws after said whole fruit has been grasped by said transfer jaws whereby said transfer jaws are adapted to hold and transfer said fruit while retaining the fruit in said predetermined position.

15. In a device of the class described, the combination of cradle shaped support means into which a whole fruit may be positioned, said cradle shaped support including a stationary wall portion upon which a portion of the lower circumferential portion of the fruit may loosely rest, said support means having an opening power actuated, relatively shiftable means adapted to approach said cradle shaped means and to grasp the while fruit at diametrically opposed portions of the whole fruit while loosely supported on said cradle-shaped wall portion, one of said relatively shiftable means operating through said opening in the support means to contact the fruit on said support means, means for shifting said second mentioned means to remove the whole fruit to a zone remote from the cradle shaped means, additional transfer means adapted to grasp the whole fruit at substantially diametrically opposed portions which are angularly disposed on the whole fruit relatively to the second mentioned holding means, means for separating said second mentioned holding means whereby said whole fruit is then positioned by said third mentioned holding means, and means for shifting said third mentioned holding means, said second and third mentioned holding means retaining the position of the fruit.

16. In a device of the class described, the combination of holding means having concaved horizontally disposed walls adapted to receive and to support a whole fruit, said concaved walls having openings therein, transfer means shiftable relative to said holding means, including mechanism for causing the transfer means to contact the upper portion of the fruit, and to contact the lower portion of the fruit through the openings of said holding means whereby firmly to hold said whole fruit while resting in said holding means, and means for shifting said transfer means whereby bodily to transfer the whole fruit from said holding means to a remote point.

17. In a device of the class described, the combination of holding means having horizontally disposed concaved continuously extending walls adapted to receive and to hold a whole fruit, said walls being formed with an open portion, transfer means shiftable relative to said holding means, including mechanism for causing the transfer means to contact the upper portion of the fruit, and to contact the lower portion of the fruit through the open portion of said horizontal walls whereby firmly to grasp and hold said whole fruit while resting on said horizontal walls, means for shifting said transfer means whereby bodily to transfer the whole fruit from said holding means to a remote point, and means for bodily shifting a portion of the holding means out of the path of movement of the transfer means whereby to permit the transfer of the whole fruit out of said holding means.

18. In a device of the class described, the combination of loading means having a stationary fruit supporting wall open at its top adapted loosely to receive thereon and support a whole fruit with its stem end exposed, mechanism associated with said stationary supporting wall including shiftably operated transfer means, means for positioning the transfer means into registration with the stationary supporting wall and for actuating said transfer means to cause the same firmly to grasp the whole fruit while supported on said stationary wall, said transfer means grasping substantially diametrically opposed portions of the periphery of the whole fruit while said whole fruit is in said holding means, and means for actuating the mechanism to transport the whole fruit from the holding means to a remote zone.

19. In a device of the class described, the combination of a stationary support, stationary fruit loading and supporting means on said support adapted loosely to hold a whole fruit in substantially predetermined position, means shiftably mounted with respect to said stationary support including transfer means and fruit centering means, means adapted to shift said shiftable means to register the centering means and transfer means with said stationary fruit loading and supporting means whereby the whole fruit when placed thereon may be piercingly engaged by said centering means while held on said loading means, means to actuate said transfer means to cause said transfer means to grasp substantially peripheral portions of the whole fruit while held on said loading and supporting means, and means for shifting said transfer means to remove the whole fruit from said loading means.

20. In a device of the class described, the combination of a support, fruit supporting means including a stationary member mounted on said support, said fruit supporting means being open at the top and having concave inner walls shaped loosely to hold a whole fruit when deposited therein, a turret associated with said support, said turret including a plurality of spaced apart fruit holding members, each including a plurality of relatively shiftable fruit holding devices and each including a whole fruit centering means, means for intermittently actuating said turret to register each fruit holding means thereon with said stationary member of the fruit holding means whereby an operator may place a whole fruit on said concaved means and center the same into engagement with the registering centering means of the turret and whereby said operator may then release his hold upon said fruit, leaving the same centered and resting on the concaved holding means, means for automatically actuating the relatively shiftable fruit holding devices carried by the turret for firmly grasping peripheral portions of the fruit while thus centered, and means for thereafter intermittently shifting the turret for transferring the whole fruit thus held from said concaved holding means to a point remote therefrom.

21. In a device of the class described, the combination of a support, a turret mounted for turning movement on said support, said turret including a plurality of spaced apart whole fruit holding and centering devices, each of said latter devices including a stationary centering member and relatively shiftable holding members, means associated with said support including complemental stationary and movable whole fruit receiving member having their upper portions open and shaped loosely to receive thereon a whole fruit, means for shifting the turret to register the centering means and the shiftable holding members thereof into registration with said fruit receiving members on said support whereby an operator may position a whole fruit to engage the centering means of said turret and to lie on the stationary holding means, means automatically actuated for causing the shiftable holding members on said turret firmly to grasp the whole fruit thus positioned, and means for thereafter shifting said turret to transfer the whole fruit by means of said relatively shiftable holding members to a point remote from said stationary whole fruit receiving member.

22. In a device of the class described, the combination of a support, means including a stationary member mounted on said support, said member having concave horizontal walls shaped loosely to hold a whole fruit when deposited therein, a turret associated with said support, said turret including a plurality of spaced apart fruit holding members, each including a plurality of relatively shiftable fruit holding devices and each including a whole fruit centering means, means for intermittently actuating said turret to register each fruit holding means thereon with said first mentioned fruit holding member whereby an operator may place a whole fruit on said horizontal walls and center the same into engagement with the registering centering means of the turret and whereby said operator may then release his hold upon said fruit, leaving the same centered and resting in the concaved horizontal supporting means, means for automatically actuating the relatively shiftable fruit holding devices carried by the turret for firmly grasping peripheral portions of the fruit while thus centered, means for thereafter intermittently shifting the turret for transferring the whole fruit thus held from said horizontal supporting walls to a point remote therefrom, additional transfer means shiftably mounted on said support, including additional relatively shiftable fruit holding devices, means for positioning said second mentioned fruit holding devices into registration with the whole fruit transferred from said horizontal walls to cause said second mentioned fruit holding members to grasp peripheral portions of the whole fruit, and means for releasing the holding devices carried by the turret and for bodily shifting said second mentioned fruit holding devices to remove the whole fruit from the centering means and from said first mentioned relatively shiftable fruit holding devices and for transporting the whole fruit thus held to an additional station.

23. In a device of the class described, the combination of a support having mounted thereon a first fruit holding means including a stationary member having concave inner walls adapted loosely to receive and position a whole fruit, a turret associated with said supporting means, said turret including a plurality of spaced apart relatively shiftable jaws and an intermediate backing member having a fruit piercing centering device thereon, means for shifting the turret to register the centering device and the jaws with the first mentioned holding means whereby an operator may place a whole fruit in said concave holding means with a portion of the fruit pierced by the centering means of the turret, automatic means actuating the relatively shiftable jaws for grasping peripheral portions of the whole fruit for holding the same thus centered, and automatic means for intermittently shifting the turret whereby to transfer the whole fruit thus centeringly held from the first mentioned holding means to a remote station.

24. In a device of the class described, the combination of a support having mounted thereon a first fruit holding means including a stationary member having concave inner walls adapted loosely to receive and position a whole fruit, a turret associated with said supporting means, said turret including a plurality of spaced apart relatively shiftable jaws and an intermediate backing member having a fruit piercing centering device thereon, means for shifting the turret to register the centering device and the jaws with the first mentioned holding means whereby an operator may place a whole fruit in said concave holding means with a portion of the fruit pierced by the centering means of the turret, automatic means actuating the relatively shiftable jaws for grasping peripheral portions of the whole fruit for holding the same thus centered, automatic means for intermittently shifting the turret whereby to transfer the whole fruit thus centeringly held from the first mentioned holding means to a remote station, additional fruit transferring means at said remote station, including an additional pair of relatively shiftable holding means adapted to grasp peripheral portions of the whole fruit, means for releasing the grasp of the relatively shiftable fruit holding means on the turret from the whole fruit, and means for shifting the second mentioned transfer jaws while holding the whole fruit to remove the whole fruit from the centering piercing means of the turret and transfer the fruit to an additional remote station.

25. In a device of the class described, the combination of relatively movable holding members forming complemental cradle-like supporting walls open at the top and upon which a whole fruit is placed and lies in supported position thereon, means bodily shiftable with the shiftable one of said holding members and including jaws shiftable relative to the shiftable member of the holding members for engaging the whole fruit at diametrically opposed peripheral portions thereof and while so supported, and means for shifting said jaws and said shiftable holding member relative to the other holding member to abduct the fruit therefrom and to convey the whole fruit to a remote point.

26. In a device of the class described, the combination of means for preliminarily holding and centering a whole fruit, said means including a stationary member and a shiftable member, said members having complemental, horizontal, open-top wall portions upon which a peripheral portion of a whole fruit is adapted loosely to lie in supported position, additional holding means adapted firmly to engage opposite portions of the periphery of the whole fruit while so centeringly held, and means for shifting said additional holding means and said shiftable member while so engaging the fruit to transport the fruit with the shiftable one of said first mentioned holding and centering means to a point remote from said stationary one of said first mentioned centering and holding means.

27. In a device of the class described, the combination of mechanism forming a stationary loading station for whole fruit comprising cradle-like walls disposed substantially horizontally and open at the top, at least a relatively large extent of said supporting walls forming the cradle-like receiver being stationary and constantly remaining in a single position whereby a succession of whole fruits may be intermittently laid in predetermined position on the supporting walls of said cradle-like receiver and will be maintained thereafter in such position, a turret associated with said cradle-like receiver and comprising an endless succession of relatively movable fruit grasping members each adapted to be brought into registration with said receiver, means to move said turret, and means relatively to actuate said fruit grasping members when in registration with said receiver, said cradle-like walls upon which the whole fruit is laid being provided with an opening through which one of said fruit grasping members operates to contact the periphery of the whole fruit and to grasp it while holding said fruit in the same predetermined position the fruit occupies when supported on said cradle-like receiver and whereby to convey the whole fruit in such position away from said cradle-like receiver.

28. An article of manufacture comprising a section of a fruit support including a relatively elongated body having a concaved inner wall concaved in a direction transversely of the longer axis of the body and forming an arc of approximately one-quarter of a circle, said concanved wall intermediate its ends being provided with a relatively wide and deep open-ended notch, said concaved wall having a laterally extending integral shank.

29. In combination, fruit holding means comprising cooperative fruit supporting sections relatively movable and adapted to be juxtaposed to form an open topped fruit supporting surface to receive and support a whole fruit loosely thereon, at least one of said sections having an opening in its base, additional fruit holding means comprising fruit gripping members adapted to be positioned on substantially opposite sides of the fruit while resting on said sections, means for closing the gripping members into contact with the fruit, one of said members passing into said opening in one of said sections to contact the periphery of the fruit, means for shifting said gripping members away from said sections and means for relatively shifting said sections to permit movement of the fruit by said gripping members away from said sections.

30. In combination, fruit holding means comprising cooperative sections relatively movable so as to be positioned contiguously with their margins substantially abutting and adapted in such position to receive and loosely hold thereon a whole fruit, at least one of said sections having an opening, additional fruit holding means comprising fruit gripping members adapted to be positioned on substantially opposite sides of the fruit while positioned on said sections, means for closing the gripping members for contact with the fruit, one of said members passing through said opening, means for shifting said gripping members away from said sections and means for relatively shifting said sections to permit movement of the fruit by said gripping members away from said sections.

31. An article of manufacture comprising a fruit support having fruit supporting walls, the inner surfaces of which are shaped to support thereon the lower curved peripheral wall surfaces of a whole fruit, with the stem axis of the whole fruit maintained thereby extending in a predetermined direction, said fruit supporting inner surfaces supportingly contacting approximately one quarter of the arcuate extent of the peripheral walls of the fruit, said fruit supportings walls at the bottom of said fruit support being formed with a relatively wide slot extending completely through said walls in a direction from top to bottom of the support so as to permit a fruit contacting jaw to enter said slot from the bottom of said support and to contact the lower periphery of said fruit while positioned on said supporting walls, said slot extending laterally through said supporting walls and having its extremity opening onto the outer wall of said support whereby to permit the free lateral passage of said jaw thruogh said slot and through the lateral wall of said fruit support while contacting the fruit and on relative movement between said jaw and said fruit support.

RAYMOND L. EWALD.

CERTIFICATE OF CORRECTION.

Patent No. 2,284,647. June 2, 1942.

RAYMOND L. EWALD.

It is hereby certified that error appears in the printed specification of the above numbered patent requiring correction as follows: Page 1, first column, line 16, for "graps" read --grasp--; page 2, first column, line 49, for "each transfer" read --the transfer--; line 58, for "on the" read --on each--; page 3, first column, line 18, for "on" read --to--; line 52, for "turet" read --turret--; and second column, line 23, for "caried" read --carried--; line 31, for "slitting" read --trimming--; page 4, first column, line 12, strike out "sequentially"; line 54, claim 2, for "stantionary" read --stationary--; and second column, line 20, claim 4, for "cruit" read --fruit--; line 23, claim 5, for "on" read --an--; page 7, first column, line 31, claim 21, for "member" read --members--; page 8, first column, line 59-60, claim 28, for "concanved" read --concaved--; and second column, line 45-46, claim 31, for "supportings" read --supporting--; line 57, same claim, for "thruogh" read --through--; and that the said Letters Patent should be read with this correction therein that the same may conform to the record of the case in the Patent Office.

Signed and sealed this 29th day of December, A. D. 1942.

Henry Van Arsdale,
Acting Commissioner of Patents.

(Seal)